(12) United States Patent
Liao et al.

(10) Patent No.: US 11,173,935 B2
(45) Date of Patent: Nov. 16, 2021

(54) LAYER BOARD AND CART INCLUDING THE LAYER BOARD

(71) Applicant: KTL INTERNATIONAL CO., LTD., Taichung (TW)

(72) Inventors: Ying-Chieh Liao, Taichung (TW); Yu-Kuo Liao, Taichung (TW)

(73) Assignee: KTL INTERNATIONAL CO., LTD., Taichung (TW)

( * ) Notice: Subject to any disclaimer, the term of this patent is extended or adjusted under 35 U.S.C. 154(b) by 0 days.

(21) Appl. No.: 16/884,293

(22) Filed: May 27, 2020

(65) Prior Publication Data

US 2020/0377135 A1 Dec. 3, 2020

(30) Foreign Application Priority Data

May 28, 2019 (TW) .................................. 108206723

(51) Int. Cl.
*B62B 3/02* (2006.01)
*B62B 3/00* (2006.01)

(52) U.S. Cl.
CPC .................................. *B62B 3/002* (2013.01)

(58) Field of Classification Search
CPC ........... B62B 3/002; B62B 3/02; A47B 31/00; A47B 87/0223; A47B 87/008; A47B 87/007
See application file for complete search history.

(56) References Cited

U.S. PATENT DOCUMENTS

| | | | |
|---|---|---|---|
| 4,998,023 A * | 3/1991 | Kitts ...................... | A47B 31/00 211/188 |
| 10,414,422 B2 * | 9/2019 | Choi ......................... | B62B 9/12 |
| 10,427,702 B2 * | 10/2019 | Phillips ..................... | B62B 3/10 |
| 2004/0227315 A1 * | 11/2004 | Van Landingham, Jr. | ................... B62B 5/06 280/47.35 |
| 2013/0033014 A1 * | 2/2013 | Yang ........................ | B62B 3/10 280/47.35 |

* cited by examiner

*Primary Examiner* — John D Walters
(74) *Attorney, Agent, or Firm* — Muncy, Geissler, Olds & Lowe, P.C.

(57) ABSTRACT

A layer board is provided for being disposed on a cart, the cart includes a plurality of columns and a plurality of roller assemblies, the layer board has at least one assembly unit, and the assembly unit is a shared structure which can be engaged with one said column or one said roller assembly. The cart having the layer board is further provided.

8 Claims, 9 Drawing Sheets ated as a top layer, and the layer board which is relatively lower is defined as a stacking layer; the cart further includes the plurality of columns and the plurality of roller assemblies, the plurality of columns are connected between the top layer and the stacking layer, one of two ends of at least one said column is connected to the assembly unit of the top layer, the other of the two ends of at least one said column is connected to a connection unit of the stacking layer; the plurality of roller assemblies are engaged with the assembly unit of the stacking layer.

LAYER BOARD AND CART INCLUDING THE LAYER BOARD

BACKGROUND OF THE INVENTION

Field of the Invention

The present invention relates to a layer board and a cart including the layer board.

Description of the Prior Art

In daily life, sometimes people need to move objects around or carry tools around and work at the same time. However, if an object is too heavy, too large or too many, it would be inconvenient and burdensome for people to grasp the object with two hands, and carts are therefore produced. Through carts, people are able to move heavy objects, push and move large objects or pile up multiple objects and move simultaneously while working along the way. In addition, to fully meet users' needs, some carts even have multi-layer structures, so people can organize the objects in layers.

However, in the cart with multiple layers, some structures are already assembled and cannot be disassembled, so it requires a greater space to store such cart. Some of the carts are designed as a pivotable structure, and the carts can be folded and stored. Although this type of structure helps to save space, the structure of the cart is more complicated, which means the type of cart is easier to have unexpected damages, higher manufacturing cost and more complicated manufacturing and assembling processes.

The present invention has arisen to mitigate and/or obviate the afore-described disadvantages.

SUMMARY OF THE INVENTION

The major object of the present invention is to provide a layer board and a cart including the layer board, an assembly unit of the layer board is optionally connectable to a column or a roller assembly, so the layer board can be used as a universal element which can assembled in any unspecified position, and a user can quickly assemble the cart. When the cart is not being used, it can be disassembled to be stored or sent.

To achieve the above and other objects, a layer board is provided for being assembled on a cart, the cart includes a plurality of columns and a plurality of roller assemblies, one of two ends of each said column has a first engaging portion and at least one first through hole, each said roller assembly includes at least one second through hole, the layer board includes a bottom wall and a circumferential side wall, the circumferential side wall is laterally connected to the bottom wall to define a receiving space, a side of the bottom wall opposite to the receiving space has at least one assembly unit, the assembly unit is used to be engaged with one said column or one said roller assembly, and the assembly unit includes a second engaging portion and at least one connection hole; wherein when the assembly unit is engaged with one said column, the second engaging portion and the first engaging portion are connected to and positioned with each other, the at least one connection hole corresponds to at least one said first through hole for a first fastening member to be disposed therewithin, and when the assembly unit is engaged with one said roller assembly, the at least one connection hole corresponds to at least one said second through hole for a second fastening member to be disposed therewithin.

To achieve the above and other objects, a cart is further provided, including two said layer boards mentioned above, wherein two said layer boards are stacked on an assembling direction, the layer board which is relatively higher is defined as a top layer, and the layer board which is relatively lower is defined as a stacking layer; the cart further includes the plurality of columns and the plurality of roller assemblies, the plurality of columns are connected between the top layer and the stacking layer, one of two ends of at least one said column is connected to the assembly unit of the top layer, the other of the two ends of at least one said column is connected to a connection unit of the stacking layer; the plurality of roller assemblies are engaged with the assembly unit of the stacking layer.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

The present invention will be clearer from the following description when viewed together with the accompanying drawings, which show, for purpose of illustrations only, the preferred embodiment in accordance with the present invention.

Figure 1:
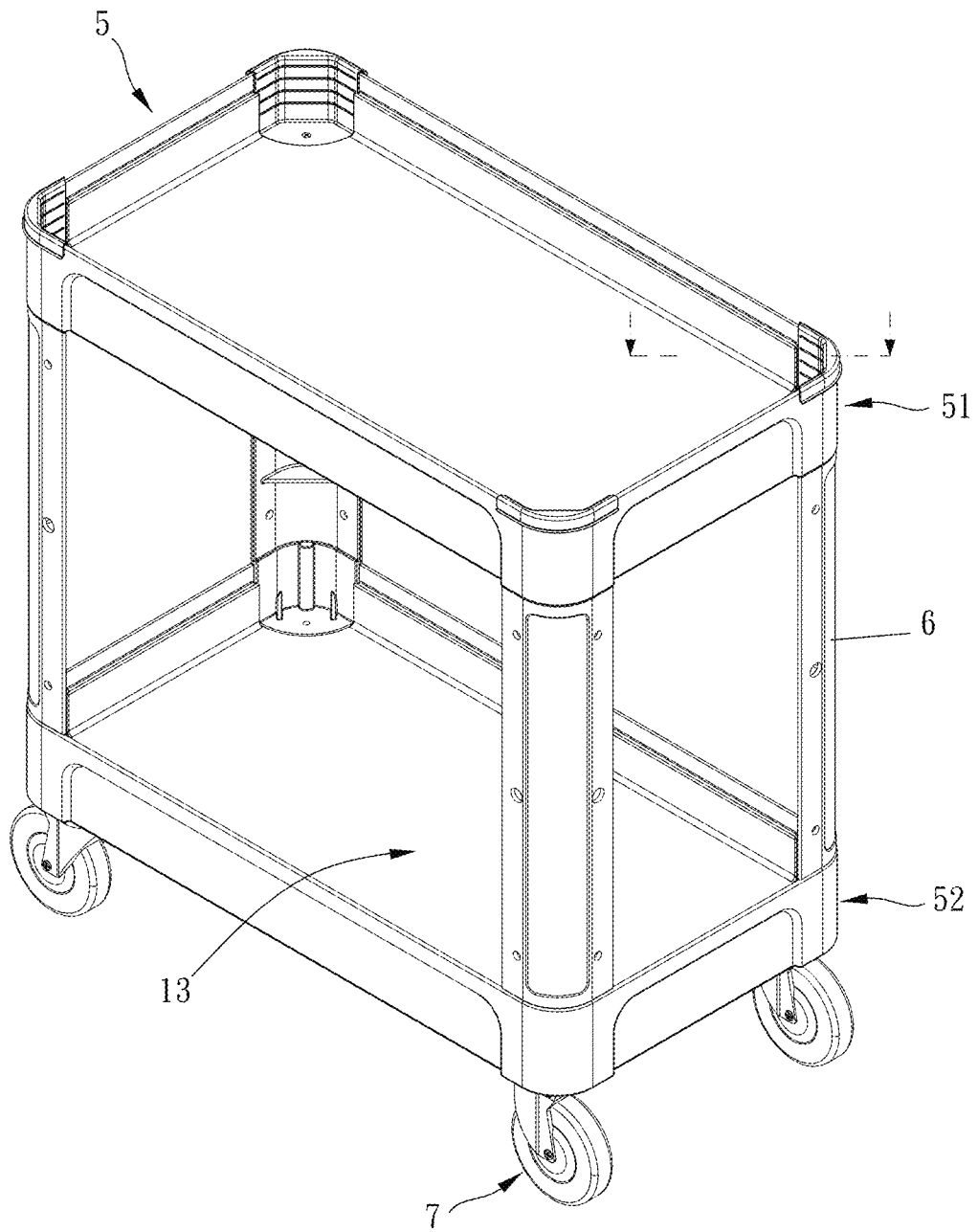
FIG. 1 is a stereogram of an embodiment of the present invention.
Figure 2:
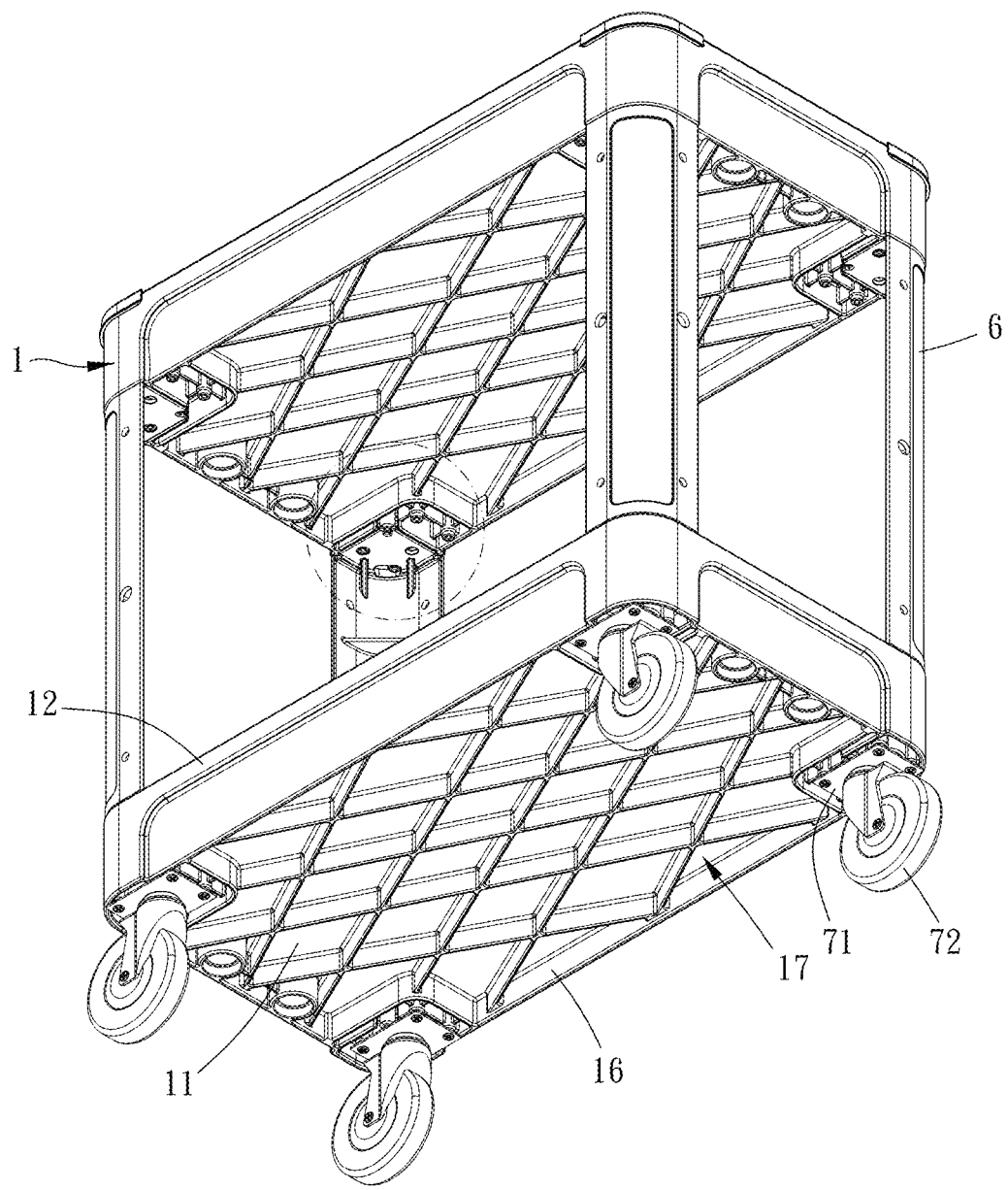
FIG. 2 is a stereogram of the embodiment of the present invention from another perspective.
Figure 3:
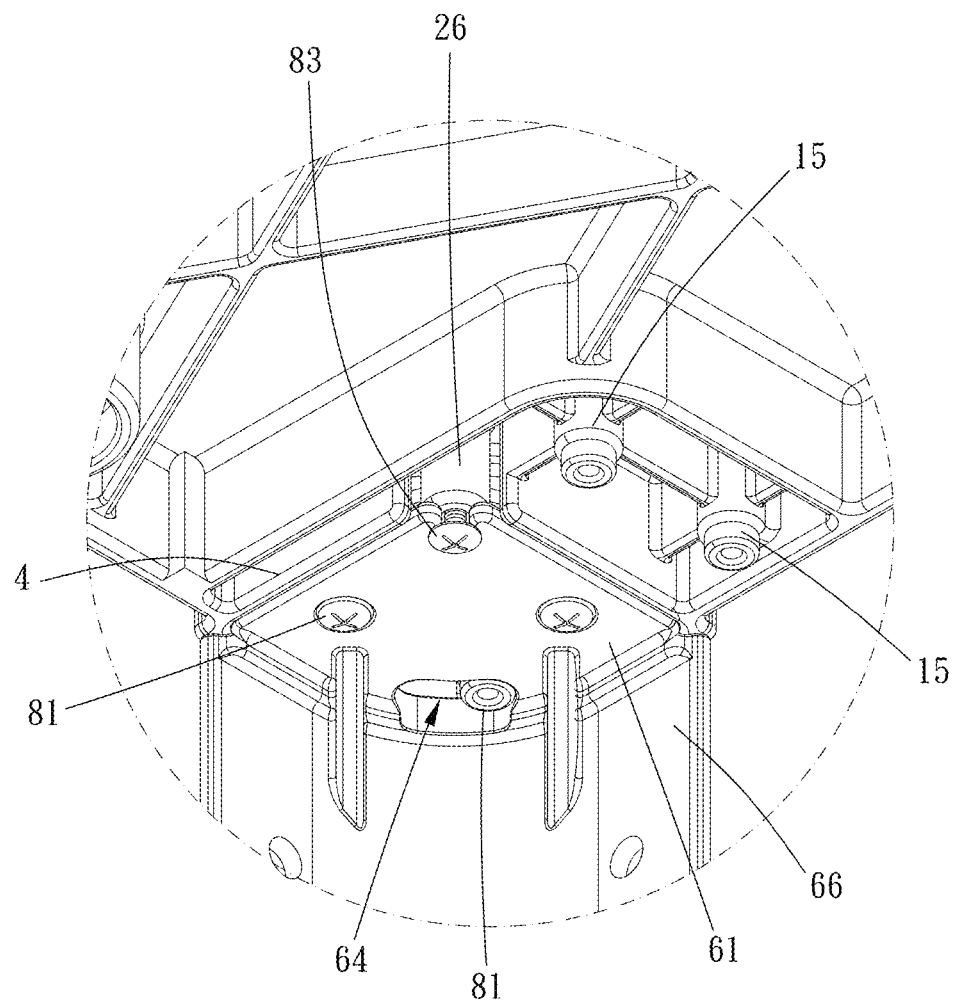
FIG. 3 is a partially-enlarged view of FIG. 2.
Figure 4:
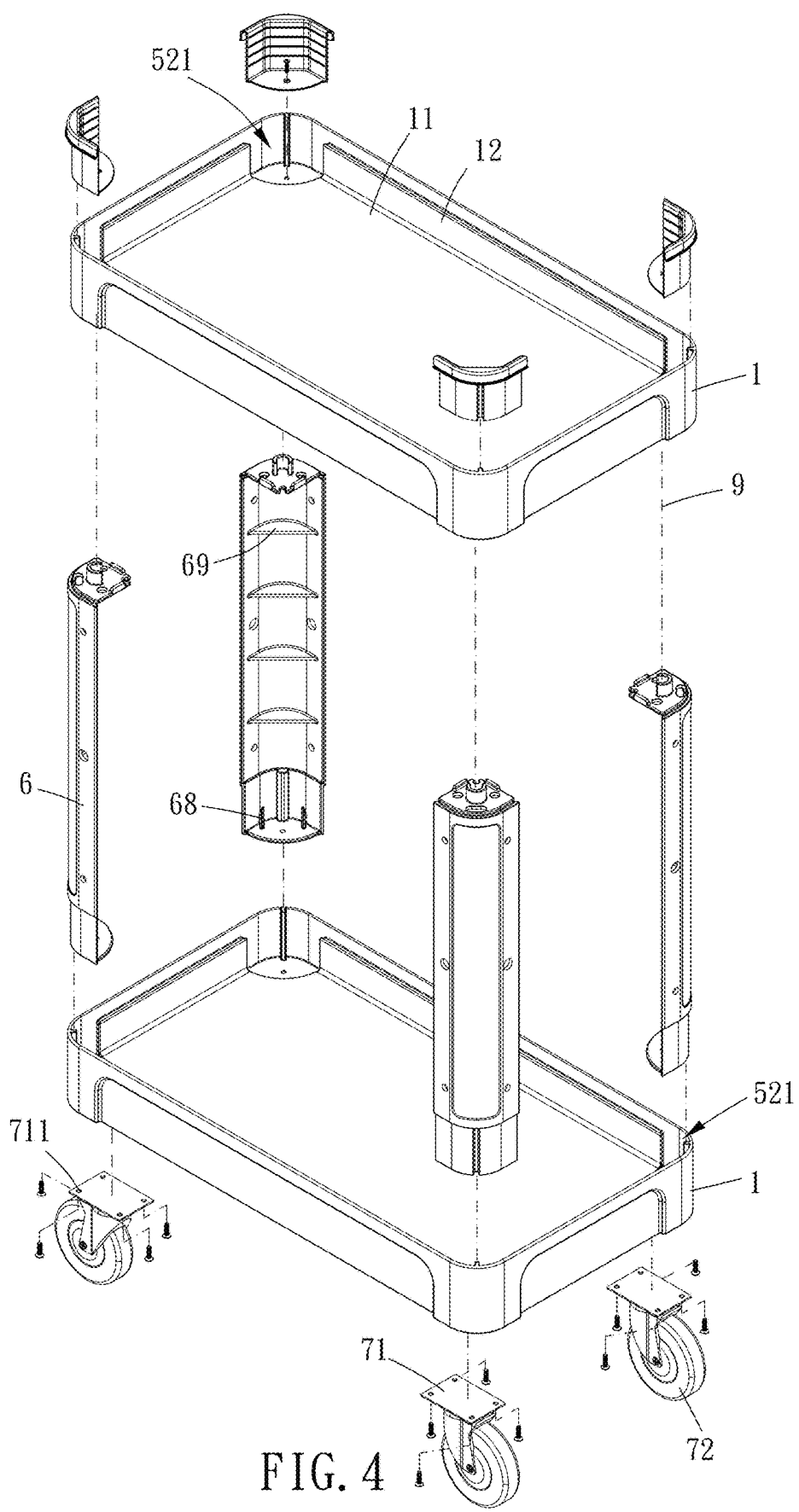
FIG. 4 is a breakdown view of FIG. 1.
Figure 5:
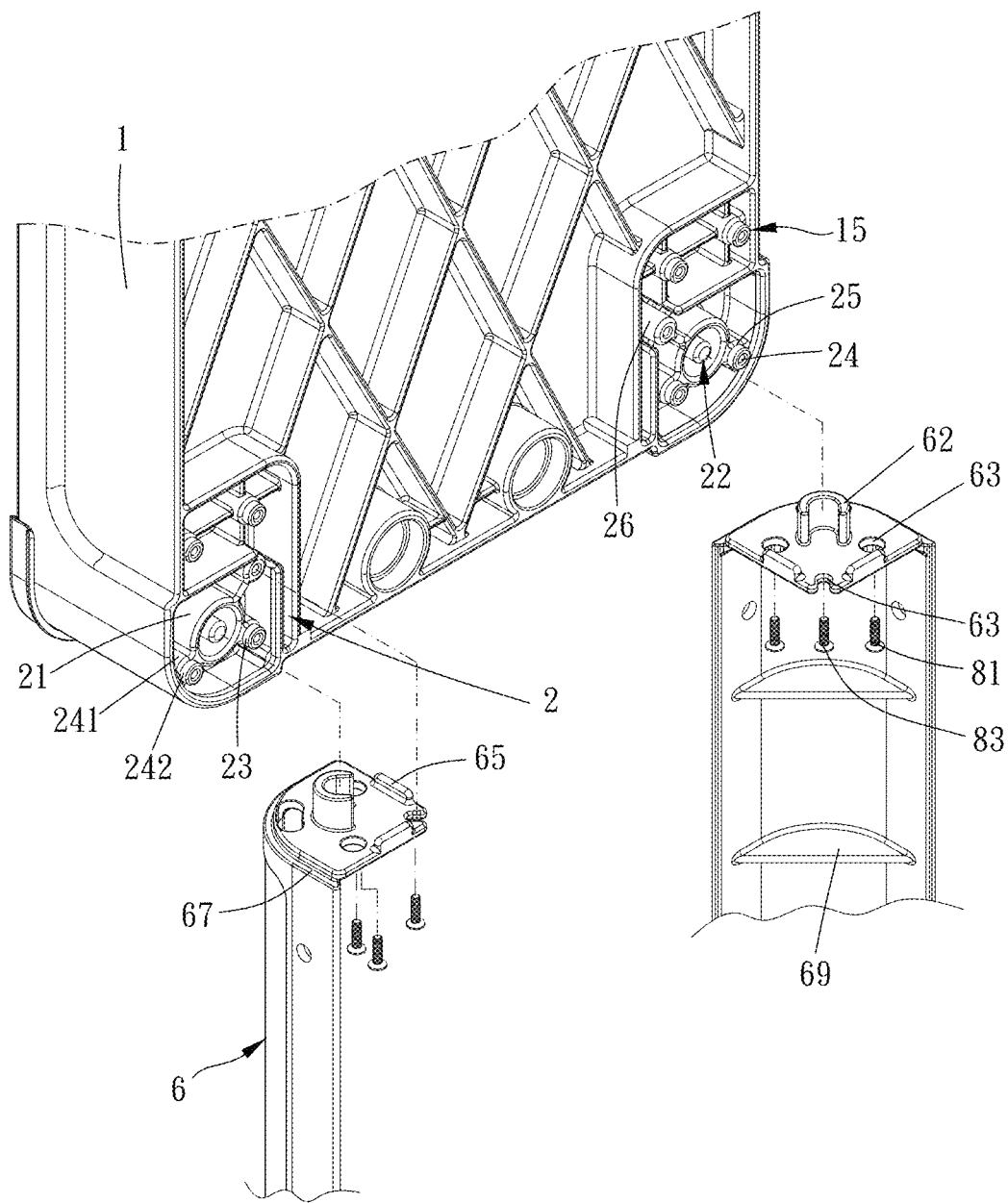
FIG. 5 is a drawing showing an assembly of an assembly unit and a column of a layer board.
Figure 6:
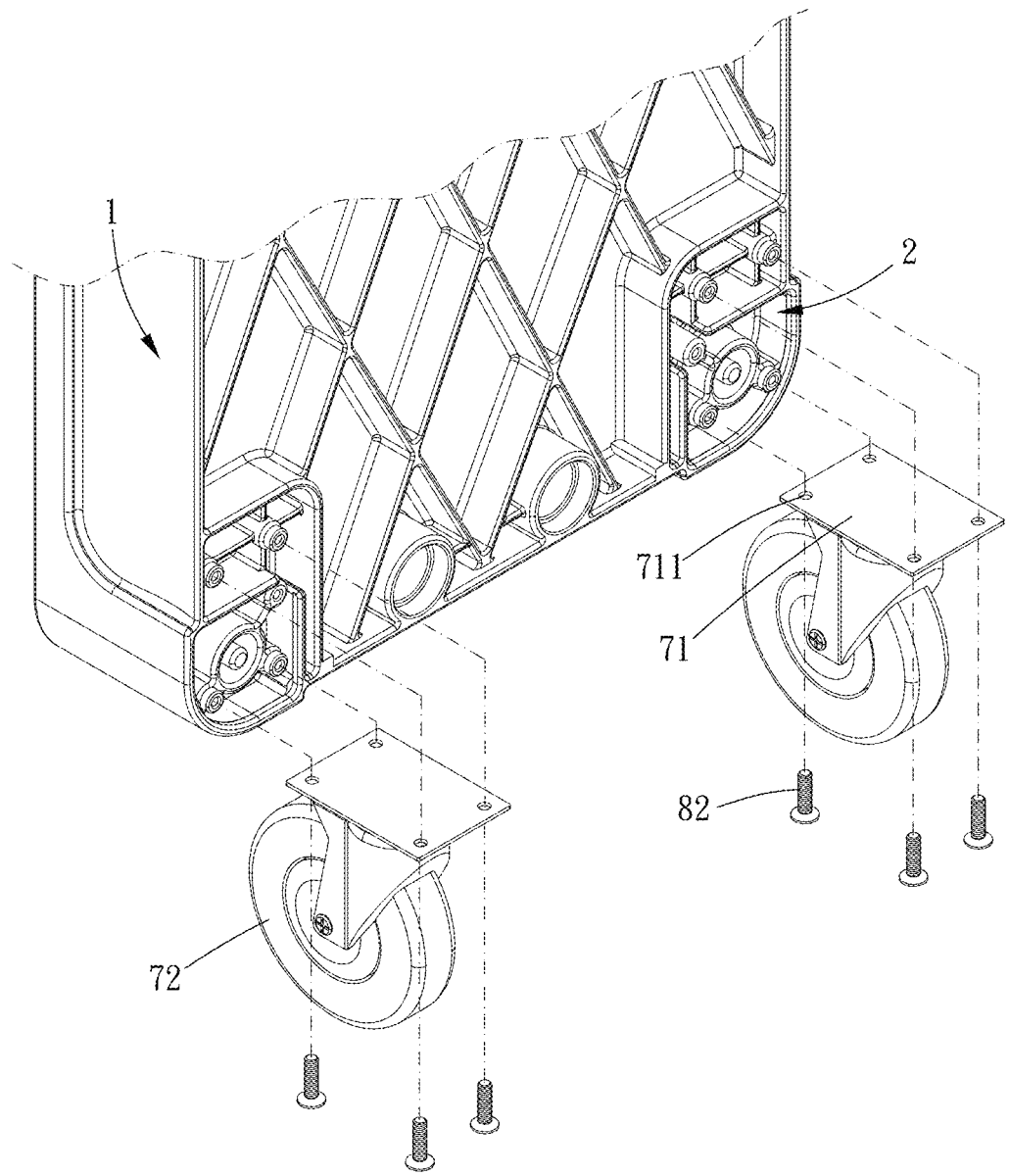
FIG. 6 is a drawing showing an assembly of the assembly unit and a roller assembly of the layer board.
Figure 7:
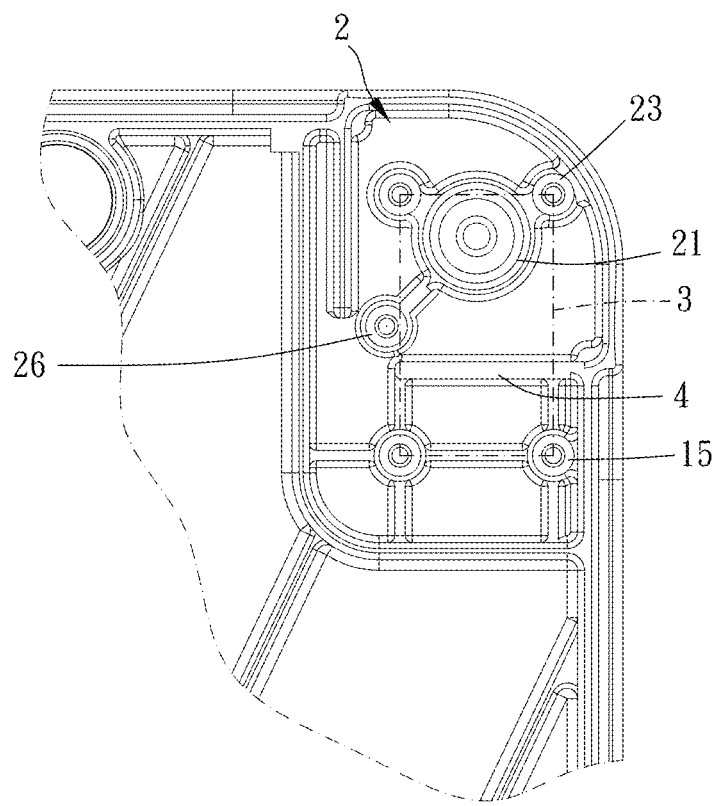
FIG. 7 is a partially-enlarged view of the assembly unit of the layer board.
Figure 8:
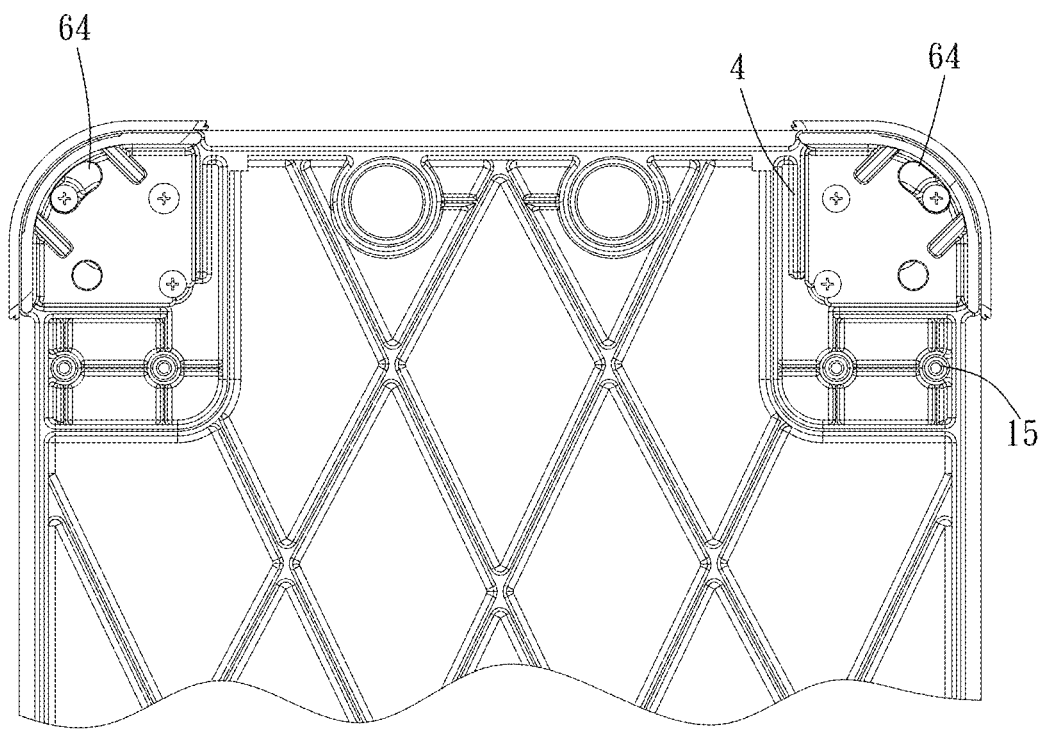
FIG. 8 is a partially bottom view showing the layer board and the column being assembled.
Figure 9:
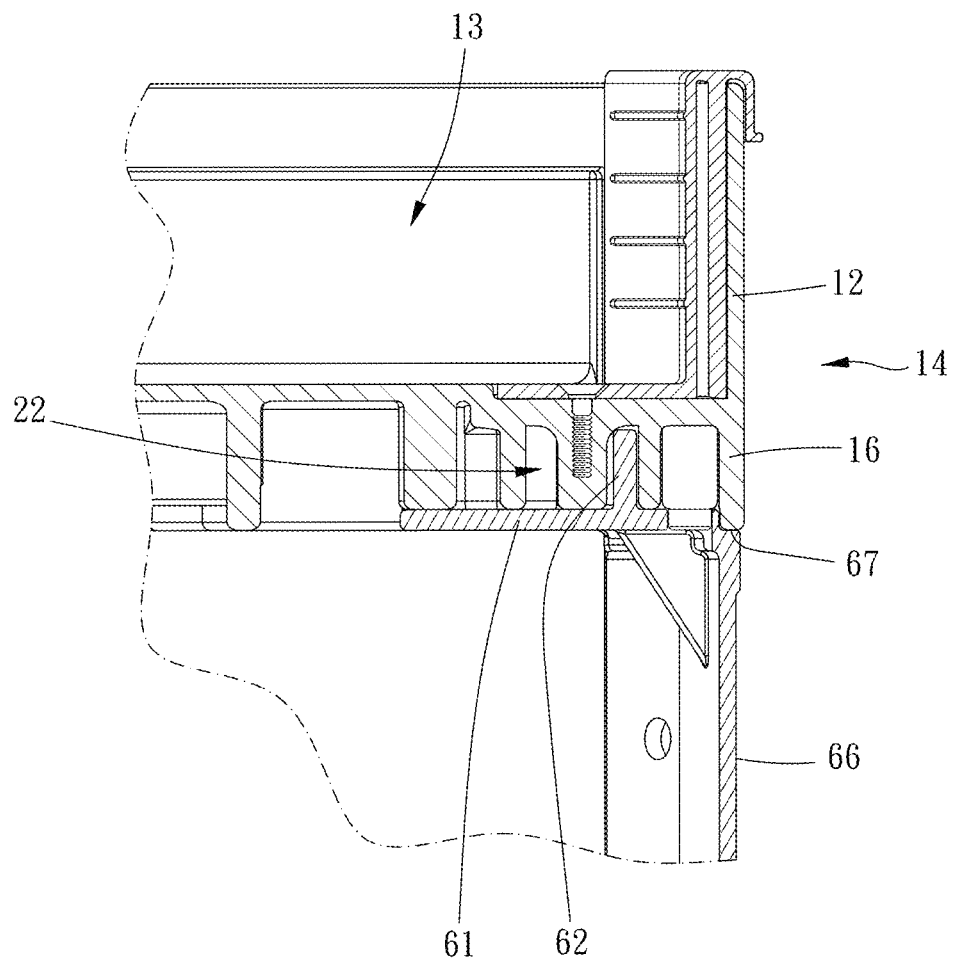
FIG. 9 is a partially cross-sectional view showing the layer board and the column being assembled.

Please refer to FIGS. 1 to 9 for an embodiment of the present invention. A layer board 1 is assembled on a cart 5, the cart 5 includes a plurality of columns 6 and a plurality of roller assemblies 7, one of two ends of each said column 6 has a first engaging portion 62 and at least one first through hole 63, and each said roller assembly 7 includes at least one second through hole 711. The layer board 1 includes a bottom wall 11 and a circumferential side wall 12, the circumferential side wall 12 is laterally connected to the bottom wall 11 to define a receiving space 13, a side of the bottom wall 11 opposite to the receiving space 13 has at least one assembly unit 2, the assembly unit 2 is used to be engaged with one said column 6 or one said roller assembly 7, and the assembly unit 2 includes a second engaging portion 22 and at least one connection hole 24.

In other words, the assembly unit 2 is an engaging structure which is shared, the layer board 1 can be engaged with different elements (the column 6 or the roller assembly 7) via the assembly unit 2 so as to be positioned in different positions of the cart 5. For example, when the layer board 1 is engaged with the plurality of columns 6, the layer board 1 can be positioned as a middle or top layer; and when the layer board 1 is engaged with the plurality of roller assemblies 7, the layer board 1 can be positioned as a bottom layer. Specifically, during a process of assembling the plurality of layer boards 1 into the cart 5, each said layer board 1 can be adapted to different positions of the cart 5, so a user does not need to distinguish an exact position where the layer board 1 should be placed or arrange an assembling sequence, and the user can assemble the cart 5 according to his/her needs and save time.

More specifically, when the assembly unit 2 is engaged with one said column 6, the second engaging portion 22 and the first engaging portion 62 are connected to and positioned with each other, the at least one connection hole 24 corresponds to at least one said first through hole 63 for a first fastening member 81 to be disposed therewithin, and when the assembly unit 2 is engaged with one said roller assembly 7, the at least one connection hole 24 corresponds to at least one said second through hole 711 for a second fastening member 82 to be disposed therewithin. Therefore, the at least one connection hole 24 corresponds at least one said first through hole 63 and at least one said second through hole 711 to serve as a shared positioning structure which strengthens the engagement strength of the layer board 1 with the column 6 or the roller assembly 7.

In this embodiment, the bottom wall 11 and the circumferential side wall 12 define a plurality of corner portions 14, the side of the bottom wall 11 includes a plurality of said assembly units 2, a number of the plurality of said assembly units 2 is equal to a number of the plurality of corner portions 14, and the plurality of said assembly units 2 are respectively disposed on the plurality of corner portions 14. Therefore, when the layer board 1 is engaged with the plurality of columns 6 (the plurality of roller assemblies 7), the plurality of columns 6 (the plurality of roller assemblies 7) are on the positions of the corner positions 14 which on a relatively outer side, so the layer board 1 can be stably supported and will not shake or tilt due to external force.

Specifically, the second engaging portion 22 is an insertion hole, and the first engaging portion 62 is a protrusion which is inserted into the insertion hole which allows the user to quickly assemble or disassemble the first and second engaging portions 62, 22. The second engaging portion 22 is annular, the first engaging portion 62 is a C-shaped column, and when the first engaging portion 62 and the second engaging portion 22 are inserted into and connected to each other, the first engaging portion 62 and the second engaging portion 22 abut against each other circumferentially in different positions and angles, so the first engaging portion 62 and the second engaging portion 22 can stably resist a lateral force and will not be detached from each other easily.

More specifically, the at least one assembly unit 2 further includes a main tubular body 21 and at least one first secondary tubular body 23, the main tubular body 21 and the least one first secondary tubular body 23 laterally extend from the bottom wall 11 to make the bottom wall 11 maintain an integral structure and a preferable structure strength, relative to the bottom wall, and the main tubular body 21 and the at least one first secondary tubular body 23 are like reinforcing ribs which can reinforce the structure strength of the corner portion 14. The main tubular body 21 has the second engaging portion 22, and the at least one first secondary tubular body 23 has the at least connection hole 24.

The at least one assembly unit 2 includes a plurality of said connection holes 24 and a plurality of said first secondary tubular bodies 23 which are the same in number with the plurality of said connection holes 24 (in this embodiment, there are two connection holes 24 and two first secondary tubular bodies 23), the first secondary tubular body 23 includes a main body 241 and a mounting portion 242, the mounting portion 242 is smaller than the main body 241 in diameter, the mounting portion 242 and the main body 241 are axially connected to each other and define a first stepped portion 25, the connection hole 24 at least penetrates through the mounting portion 242 axially, the mounting portion 242 is insertable into the first through hole 63 of the column 6 or the second through hole 711 of the roller assembly 7 to increase a stability on a radial direction when assembling, and the first stepped portion 25 is abuttable against the column 6 or the roller assembly 7 to provide an axial support to increase an engagement stability. As viewed in an axial direction, an exterior profile of the main tubular body 21, an exterior profile of the main body 241 and an exterior profile of the mounting portion 242 are circular.

Preferably, take the bottom wall 11 as a datum, the main tubular body 21 is equal to the main body 241 of the first secondary tubular body 23 in height, so the first stepped portion 25 and an end face of the main tubular body 21 are in a same height to define a supporting face which is plane to be engaged with the column 6 or the roller assembly 7. More preferably, a diameter of the main tubular body 21 is the greatest and is triple a diameter of the main body 241 to provide good structure strength, and the second engagement portion 22 has a greater area to contact with the first engagement portion 62 to improve the engagement. The plurality of said first secondary tubular bodies 23 and the main tubular body 21 are radially connected to reinforce the structure strength and to effectively resist the external force.

More preferably, the at least one assembly unit 2 further includes a second secondary tubular body 26, the second secondary tubular body 26 is identical to the main body 241 of the first secondary tubular body 23, and the second secondary tubular body 26 is radially connected to the main tubular body 21 to increase the structure strength. The second secondary tubular body 26 is abuttable against the column 6 or the roller assembly 7 to serve as a supporting abut element which is auxiliary, and the second secondary tubular body 26 has a threaded hole for a third fastening member 83 which is disposed through the column 6 to be positioningly screwed therewith to increase a positioning effect.

It is to be noted that each of the at least one connection hole 24 is a threaded hole, and the first, second and third fastening members 81, 82, 83 are screws, which can be quickly assembled or disassembled, and the user doesn't need to worry about getting the screws lost.

The layer board 1 further includes a plurality of third secondary tubular bodies 15 (in this embodiment, there are two third secondary tubular bodies 15), the third secondary tubular body 15 is identical to the first secondary tubular body 23, and the third secondary tubular body 15 is for corresponding to the second through hole 711 of the roller assembly 7 to increase a connection stability of the roller assembly 7 and the layer board 1. In addition, a face profile formed by a connection of a center of a plurality of the first secondary tubular bodies 23 and a center of the plurality of the third secondary tubular bodies 15 is a rectangle 3, so when the first fastening member 81 and the second fastening member 82 are screwed with the first and third secondary tubular bodies 23, 15, a force produced can be evenly distributed. A center of the second secondary tubular body 26 is outside of the rectangle 3, so when a structure of the roller assembly 7 is incomplete, the user can screw the third fastening member 83 with the second secondary tubular body 26 to laterally support the roller assembly 7 via the third fastening member 83.

A cart 5 is further provided, including two said layer boards 1 mentioned above, two said layer boards 1 are stacked on an assembling direction 9, the layer board 1 which is relatively higher is defined as a top layer 51, and the layer board 1 which is relatively lower is defined as a stacking layer 52; the cart 5 further includes the plurality of columns 6 and the plurality of roller assemblies 7.

The plurality of columns 6 are connected between the top layer 51 and the stacking layer 52, one of two ends of at least one said column 6 is connected to the assembly unit 2 of the top layer 51, the other of the two ends of at least one said column 6 is connected to a connection unit 521 of the stacking layer 52, and the connection unit 521 is disposed between the bottom wall 11 and the circumferential side wall 12 to increase the engagement stability between two said layer boards 1. It is understandable that the plurality of roller assemblies 7 are engaged with the assembly unit 2 of the stacking layer 52 so that the cart 5 can slide. The roller assembly 7 includes a bottom board 71 and a roller 72, the roller 72 is rotatably positioned on the bottom board 71, the bottom board 71 has the at least one second through hole 711, in this embodiment, there are four second through holes 711 which respectively correspond to two said first secondary tubular bodies 23 and two said third secondary tubular bodies 15.

Specifically, the layer board 1 further includes a blocking wall 16, the blocking wall 16 and the circumferential side wall 12 respectively extend from two opposite sides of the bottom wall 11, the blocking wall 16 and the bottom wall 11 define an assembling space 17, the at least one assembly unit 2 is disposed in the assembling space 17, and the blocking wall 16 can effectively prevent the at least one assembly unit 2 from being impacted directly so as to keep the structural integrity of the at least one assembly unit 2.

More specifically, the column 6 includes a plurality of said first through holes 63, the column 6 further includes a prop portion 61 and an extension portion 66, the first engaging portion 62 and the plurality of said first through holes 63 are disposed on the prop portion 61, and the extension portion 66 and the first engaging portion 62 respectively extend along two opposite sides of the prop portion 61. Two of the plurality of said first through holes 63 preferably communicate with each other on the prop portion 61 to define a shared hole 64, and when the column 6 is connected to two symmetrical sides of the layer board 1, the shared hole 64 corresponds to one said connection hole 24; in other words, during the manufacturing process, a manufacturer can produce the columns 6 in the completely same structure.

In this embodiment, one said first through hole 63 radially penetrates the prop portion 61 for the third fastening member 83 to be disposed therewithin, so the third fastening member 83 can laterally abut against the prop portion 61 to increase the positioning effect.

Preferably, the column 6 further includes two first rib portions 68 and a plurality of second rib portions 69, two ends of each said first rib portion 68 are respectively connected to the prop portion 61 and the extension portion 66 to reinforce the connection between the prop portion 61 and the extension portion 66, and each said second rib portion 69 is disposed on the extension portion 66 to reinforce the whole structural strength to provide a preferable support. The shared hole 64 is between two said first rib portions 68.

More preferably, the extension portion 66 laterally extends from a part of a circumference of the prop portion 61, a connected part of the extension portion 66 and the prop portion 61 is a second stepped portion 67, and the second stepped portion 67 abuts against the blocking wall 16 to increase the connection and stability of the column 6 and the layer board 1. In this embodiment, the prop portion 61 is fan-shaped, and the extension portion 66 is curved.

Still more preferably, the assembly unit 2 further includes at least one supporting wall 4, the at least one supporting wall 4 laterally extends from the bottom wall 11, the column 6 further includes at least one side abutting member 65, and the at least one side abutting member 65 protrudes beyond the prop portion 61. When the at least one assembly unit 2 is connected to the column 6, the at least one side abutting portion 65 and the at least one supporting wall 4 laterally abut against each other, the at least one supporting wall 4 provides enough lateral support to the at least one side abutting portion 65 for the column 6 to be stably positioned on the layer board 1. In this embodiment, take the bottom wall 11 as a datum, the at least one supporting wall 4 is greater than the second engaging portion 22 and the at least one connection hole 24 in height.

Give the above, in the layer board and the cart including the layer board, the assembly unit of the layer board is a basic shared structure, so the layer board can be optionally engaged with the column or the roller assembly according to the position of the layer board relative to the cart. Therefore, it is easier for the user to assemble the cart, and it is convenient for the manufacturer to produce the layer boards in the same structure.

While we have shown and described various embodiments in accordance with the present invention, it should be clear to those skilled in the art that further embodiments may be made without departing from the scope of the present invention.

What is claimed is:

1. A layer board, for being disposed on a cart, the cart including a plurality of columns and a plurality of roller assemblies, one of two ends of each said column having a first engaging portion and at least one first through hole, each said roller assembly including at least one second through hole, the layer board including a bottom wall and a circumferential side wall, the circumferential side wall being laterally connected to the bottom wall to define a receiving space, a side of the bottom wall opposite to the receiving space having at least one assembly unit, the assembly unit being used to be engaged with one said column or one said roller assembly, the assembly unit including a second engaging portion and at least one connection hole; wherein when the assembly unit is engaged with one said column, the second engaging portion and the first engaging portion are connected to and positioned with each other, the at least one connection hole corresponds to at least one said first through hole for a first fastening member to be disposed therewithin, and when the assembly unit is engaged with one said roller assembly, the at least one connection hole corresponds to at least one said second through hole for a second fastening member to be disposed therewithin; wherein the at least one assembly unit further includes a main tubular body and at least one first secondary tubular body, the main tubular body and the least one first secondary tubular body laterally extend from the bottom wall, the main tubular body has the second engaging portion, and the at least one first secondary tubular body has the at least connection hole.

2. The layer board of claim 1, wherein the bottom wall and the circumferential side wall define a plurality of corner portions, the side of the bottom wall includes a plurality of said assembly units, a number of the plurality of said assembly units is equal to a number of the plurality of corner portions, and the plurality of said assembly units are respectively disposed on the plurality of corner portions.

3. The layer board of claim 1, wherein the second engaging portion is an insertion hole, and the first engaging portion is a protrusion which is inserted into the insertion hole.

4. The layer board of claim 1, wherein the first secondary tubular body includes a main body and a mounting portion, the mounting portion is smaller than the main body in diameter, the mounting portion and the main body are axially connected to each other and define a first stepped portion, the connection hole at least penetrates through the mounting portion axially, the mounting portion is insertable into the first through hole of the column or the second through hole of the roller assembly, and the first stepped portion is abuttable against the column or the roller assembly.

5. The layer board of claim 4, wherein the bottom wall and the circumferential side wall define a plurality of corner portions, the side of the bottom wall includes a plurality of said assembly units, a number of the plurality of said assembly units is equal to a number of the plurality of corner portions, and the plurality of said assembly units are respectively disposed on the plurality of corner portions; the second engaging portion is an insertion hole, and the first engaging portion is a protrusion which is inserted into the insertion hole; the at least one assembly unit includes a plurality of said connection holes and a plurality of said first secondary tubular bodies which are the same in number with the plurality of said connection holes, and the plurality of said first secondary tubular bodies and the main body are radially connected to each other; the second engaging portion is annular, and the first engaging portion is a C-shaped column; take the bottom wall as a datum, the main tubular body is equal to the main body of the first secondary tubular body in height; the at least one assembly unit further includes a second secondary tubular body, the second secondary tubular body is identical to the main body of the first secondary tubular body, the second secondary tubular body is radially connected to the main tubular body, the second secondary tubular body is abuttable against the column or the roller assembly, and the second secondary tubular body has a threaded hole for a third fastening member which is disposed through the column to be positioningly screwed therewith; the layer board further includes a plurality of third secondary tubular bodies, the third secondary tubular body is identical to the first secondary tubular body, and the third secondary tubular body is for corresponding to the second through hole of the roller assembly; a face profile formed by a connection of a center of a plurality of the first secondary tubular bodies and a center of the plurality of the third secondary tubular bodies is a rectangle; a center of the second secondary tubular body is outside of the rectangle; a diameter of the main tubular body is the greatest and is triple a diameter of the main body; as viewed in an axial direction, an exterior profile of the main tubular body, an exterior profile of the main body and an exterior profile of the mounting portion are circular; each of the at least one connection hole is a threaded hole, and the first, second and third fastening members are screws.

6. A cart, including two said layer boards of claim 1, wherein two said layer boards are stacked on an assembling direction, the layer board which is relatively higher is defined as a top layer, and the layer board which is relatively lower is defined as a stacking layer; the cart further including:

the plurality of columns, connected between the top layer and the stacking layer, one of two ends of at least one said column being connected to the assembly unit of the top layer, the other of the two ends of at least one said column being connected to a connection unit of the stacking layer;

the plurality of roller assemblies, engaged with the assembly unit of the stacking layer;

wherein the column includes a plurality of said first through holes, the column further includes a prop portion and an extension portion, the first engaging portion and the plurality of said first through holes are disposed on the prop portion, and the extension portion and the first engaging portion respectively extend along two opposite sides of the prop portion; wherein two of the plurality of said first through holes communicate with each other on the prop portion to define a shared hole, and when the column is connected to two symmetrical sides of the layer board, the shared hole corresponds to one said connection hole.

7. The cart of claim 6, wherein the assembly unit further includes at least one supporting wall, the at least one supporting wall laterally extends from the bottom wall, the column further includes at least one side abutting member, and the at least one side abutting member protrudes beyond the prop portion; wherein when the at least one assembly unit is connected to the column, the at least one side abutting portion and the at least one supporting wall laterally abut against each other.

8. The cart of claim 7, wherein the layer board further includes a blocking wall, the blocking wall and the circumferential side wall respectively extend from two opposite sides of the bottom wall, the blocking wall and the bottom wall define an assembling space, and the at least one assembly unit is disposed in the assembling space; the extension portion laterally extends from a part of a circumference of the prop portion, a connected part of the extension portion and the prop portion is a second stepped portion, and the second stepped portion abuts against the blocking wall; the column further includes two first rib portions and a plurality of second rib portions, two ends of each said first rib portion are respectively connected to the prop portion and the extension portion, and each said second rib portion is disposed on the extension portion; the shared hole is between two said first rib portions; one said first through hole radially penetrates the prop portion for the third fastening member to be disposed therewithin; the prop portion is fan-shaped, and the extension portion is curved; the roller assembly includes a bottom board and a roller, the roller is rotatably positioned on the bottom board, and the bottom board has the at least one second through hole; take the bottom wall as a datum, the at least one supporting wall is greater than the second engaging portion and the at least one connection hole in height.

* * * * *